US006951620B2

(12) United States Patent
Brauch et al.

(10) Patent No.: US 6,951,620 B2
(45) Date of Patent: Oct. 4, 2005

(54) APPARATUS AND METHODS FOR COLLECTING SLUDGE FROM THE FLOOR OF A SETTLER BASIN

(75) Inventors: Joseph Karl Brauch, Golden, CO (US); Charles Lonnie Meurer, Golden, CO (US); James Malcolm Meurer, Wheatridge, CO (US)

(73) Assignee: Meurer Research, Inc., Golden, CO (US)

( * ) Notice: Subject to any disclaimer, the term of this patent is extended or adjusted under 35 U.S.C. 154(b) by 134 days.

(21) Appl. No.: 10/420,570

(22) Filed: Apr. 21, 2003

(65) Prior Publication Data

US 2004/0206695 A1 Oct. 21, 2004

(51) Int. Cl.[7] ............................................... B01D 21/18
(52) U.S. Cl. .................... 210/803; 210/527; 210/532.1
(58) Field of Search ................................ 210/803, 523, 210/525, 527, 532.1, 540

(56) References Cited

U.S. PATENT DOCUMENTS

| 630,962 | A | 8/1899 | Wood | |
|---|---|---|---|---|
| 1,918,742 | A | 7/1933 | Elrod | 210/525 |
| 2,646,889 | A | 7/1953 | Dulak | 210/207 |
| 3,333,704 | A | 8/1967 | McGivern | 210/242 |
| 3,353,683 | A | 11/1967 | Geiger | 210/527 |
| 3,416,176 | A | 12/1968 | Ravitts | 15/1.7 |
| 3,494,462 | A | 2/1970 | Baud | 210/112 |
| 3,616,651 | A | 11/1971 | Elrod | 405/158 |
| 3,669,271 | A | 6/1972 | McGivern | 210/128 |
| 3,707,737 | A | 1/1973 | Brower | 15/1.7 |
| 4,090,966 | A | 5/1978 | Clendenen | 210/143 |
| 4,193,871 | A | 3/1980 | White et al. | 210/525 |
| 4,401,576 | A | 8/1983 | Meurer | 210/803 |
| 4,477,939 | A | 10/1984 | White et al. | 15/246.5 |
| 4,514,303 | A | 4/1985 | Moore | 210/519 |
| 4,551,246 | A | 11/1985 | Coffing | 210/221 |
| 4,555,340 | A | 11/1985 | Boyle | 210/248 |
| 5,059,312 | A | * 10/1991 | Galletti | 210/540 |
| 5,366,638 | A | 11/1994 | Moore | 210/802 |
| 5,693,218 | A | * 12/1997 | Yamamoto et al. | 210/540 |
| 6,497,249 | B1 | * 12/2002 | Swan et al. | 210/527 |

FOREIGN PATENT DOCUMENTS

GB 742315 12/1955

* cited by examiner

*Primary Examiner*—Christopher Upton
(74) *Attorney, Agent, or Firm*—Chester E. Martine, Jr.

(57) ABSTRACT

A system meets needs in material collection by significantly increasing the flow rate through a header that collects sludge without causing problems in priming. Telescopic pipes stay in a line adjacent to the bottom of a basin and do not float upwardly into or against equipment in the basin. The entire sludge collecting system is in a space of a low-clearance height H under the equipment that extends downwardly near the bottom of the basin.

10 Claims, 9 Drawing Sheets

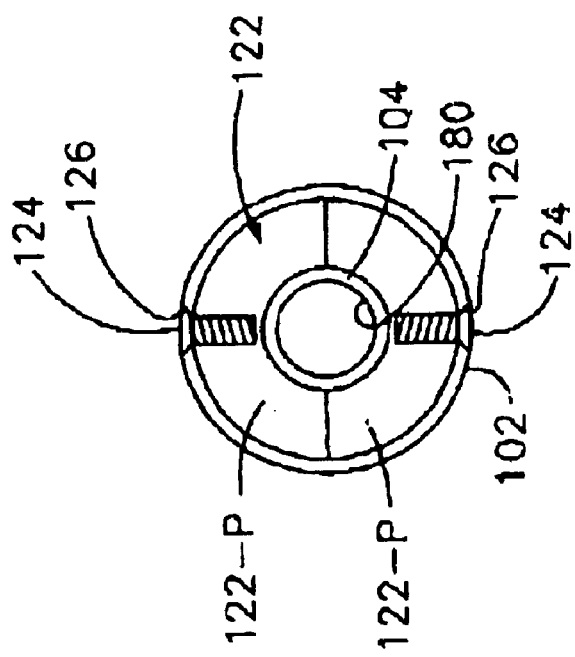

APPARATUS AND METHODS FOR COLLECTING SLUDGE FROM THE FLOOR OF A SETTLER BASIN

FIELD OF THE INVENTION

The present invention relates to the collection of materials from liquids, and more particularly to a telescopic pipe arrangement carrying a sludge collector header in a material collection basin.

BACKGROUND OF THE INVENTION

In the past, containers (e.g., basins or tanks) have been provided to house apparatus in which materials are collected. For example, materials may be collected from liquids by plate or tube settlers that promote settling of the material to the bottom of the basin. In other cases, flocculators may be housed in such containers, and materials often inadvertently move in the flocculators to the bottom of the basin. Because the flocculators are designed to circulate the liquid and materials, rather than promoting settling of the materials, the materials that inadvertently collect at the bottom of the basin present a problem. In both cases, the materials on the bottom may be referred to as sludge.

In the case of the settlers, for example, the sludge is collected, or removed, from the bottom to make room for more materials as more liquid and materials flow into the basin. In the past, sludge collection equipment has been mounted on or near the bottom for gathering the sludge and flowing the sludge out of the basins. Such equipment has included a so-called header pipe (e.g., a hollow tube) mounted for movement along a path adjacent to the bottom. The header pipe is below the settler plates of a settler, for example. Low pressure has been applied to the header pipe as the header pipe moves along the path. Holes in the pipe admit the sludge and liquid from the bottom of the basin. The holes may be of the type described in U.S. Pat. No. 5,914,049, issued on Jun. 22, 1999, and entitled "Method and Apparatus For Helical Flow In Header Conduit", the disclosure of which is incorporated by reference. Under the action of the low pressure, the sludge and the liquid flow into and through the header pipe, and from the header pipe through a flexible outlet hose to a discharge location out of the basin.

The low pressure has been applied to the header pipe by the flexible outlet hose. Such hoses have generally been small diameter hoses, e.g., not exceeding four inches in diameter. Also, the flexible hoses are typically ribbed on the inside, which restricts the inside diameter and increases head loss. Generally, such small diameter hoses can only induce a maximum flow rate of about 200 gallons per minute (gpm) in the header pipe. Thus, the flow rate through the header pipe has been limited by the flow capacity of the flexible outlet hoses.

An unacceptable solution to this flow rate problem is to use many of the flexible hoses. That solution is unacceptable because the flexible outlet hoses can flex. Each flexible hose is thus free to rise (i.e., float) above the header pipe under buoyancy forces of gases in the flexible outlet hose. As a result, the flexible hoses have in the past risen above the header pipe and a portion of each flexible hose has assumed an inverted U-shape. Unfortunately, because the U-shaped portion is above the level of the header pipe, and is above the level of an outlet of the flexible hose from the basin, the gas becomes trapped in such inverted U-shaped portion, making it difficult to prime the hose when starting the sludge collecting operation. When many flexible hoses are used to provide more flow rate from the header, the priming problem is increased.

Also, because the flexible outlet hoses tend to float, these hoses tend to interfere with the operation of the settlers, which extend downwardly in the basin toward the bottom and provide a low-clearance situation at the bottom of the basin. A similar problem would exist with attempts to use such hoses to remove the material from beneath the flocculators.

What is needed then is a way of significantly increasing the flow rate through a header pipe that collects material from the bottom without causing problems in priming the sludge collection system. What is also needed is a way to achieve such sludge collection, while having an easily primed collection system, and to provide the entire sludge collecting system in the low-clearance space under settler, flocculating and related equipment that extends down near the bottom of the basin. What is further needed, then, is to achieve these features, while still allowing the sludge collecting system to traverse the header from one end of the basin to the opposite end of the basin. What is finally needed then, is to achieve these features, while allowing the sludge collecting system to traverse the header from one end of a very long basin to the opposite end of the very long basin.

SUMMARY OF THE INVENTION

Briefly, the present invention meets all of the above needs by providing a way of significantly increasing the flow rate through a header pipe that collects material from the bottom without causing the problems in priming the sludge collection system. The present invention also provides a way of achieving such sludge collection, while having an easily primed collection system, and providing the entire sludge collecting system in the low-clearance space under the settler and flocculating equipment that extends down near the bottom of the basin.

The way of significantly increasing the flow rate through a header pipe that collects material from the bottom is by using a larger-diameter pipe assembly connected to the header pipe. The way of avoiding problems in priming the sludge collection system is by making the larger-diameter pipe assembly rigid so that it is not free to rise (float) above the level of the header pipe in the basin, or the outlet of the pipe assembly, which is near the bottom of the basin. The way of achieving such sludge collection, while having an easily primed collection system, and providing the entire sludge collecting system in the low-clearance space under the settler and flocculating equipment that extends down near the bottom of the basin, is to mount the larger-diameter, rigid pipe assembly directly adjacent to the bottom of the basin, e.g., along the path normally taken by the header pipe as it traverses the bottom of the basin. The way of achieving these features, while still allowing the sludge collecting system to traverse the header from one end of the basin to the opposite end of the basin, is by making the larger-diameter rigid pipe assembly telescopic, that is, in two parts that have a telescopic relationship. In this manner, one telescopic pipe may be secured or fixed to the basin, as by being held in place as it extends through an end wall of the basin to a sludge outlet outside the basin. Such fixed pipe may be a larger-diameter pipe, measured relative to the small (e.g., maximum of four inches) prior flexible hoses described above. The other telescopic pipe may be somewhat larger (e.g., about two inches larger) than the fixed pipe so as to receive the fixed pipe and permit relative movement between the two telescopic pipes. The other telescopic pipe may be called the outer, or movable, telescopic pipe. The movable pipe carries one or more of the headers and may be moved by a low-profile cable drive relative to the bottom of the basin and between the end walls of the basin to present the headers to the sludge that accumulates on the bottom of the basin awaiting collection. The way of achieving these features, while allowing the sludge collecting system to traverse the header from one end of a very long basin to the opposite end of the very long basin, is to have the inner pipe extend fully between the opposite end walls of the very long basin and be a guide for the outer pipe that defines part of a conduit for collecting the material and liquid that are to be directed out of the basin.

One aspect of the present invention is to provide a system for collecting material in which a first rigid pipe and a second rigid pipe each define a conduit. The first and second pipes are in telescopic relationship, one received within the other so that the conduits of the pipes cooperate to define a material collection conduit. Headers may be secured to one of the rigid pipes and generally have openings through which to collect the material. The headers define header conduits extending from the header openings to the conduit of the one rigid pipe to carry the material to the material collection conduit.

Another aspect of the present invention is to provide the system for collecting material with a seal positioned between the first pipe and the second pipe. With the pipes operated at low pressure, the seal reduces the flow of the material into the material collection conduit from other than the header openings. Because the header openings are spaced across a width of the basin, the seals promote sludge collection across the width of the basin. The seal also permits relative movement between the pipes in the telescopic relationship, and thus promotes the traversing of the headers.

Another aspect of the present invention is to provide the system for collecting material in a basin configured with a bottom to contain the material. The first pipe and the second pipe are supported on the bottom of the basin. The first pipe is the one of the pipes to which the headers are secured, the second pipe being the one pipe received in the other pipe. The second pipe is secured to the basin. The first pipe is movable relative to the basin and to the second pipe so that the material collection conduit is extendable and retractable as the first pipe moves relative to the basin. The extendable and retractable material collection conduit carries collected material from the header opening to the first conduit of the first pipe and to the second conduit of the second pipe.

Still another aspect of the present invention is to provide the system for collecting material with an exemplary two headers. One of the two headers is positioned adjacent to one end of the first pipe and the other of the two headers is positioned adjacent to the other end of the first pipe.

Yet another aspect of the present invention is to provide the system for collecting material with one header, and the second pipe is configured with a seal end located about equidistant between the end walls of the basin. The first pipe moves relative to the seal end of the second pipe and is configured with a header support end secured to the header, the header support end being spaced from the seal end. The one header is positioned at the header support end of the first pipe.

One other aspect of the present invention is to provide the system for collecting material with a drive connected to the first pipe, the drive being configured to move the first pipe relative to the basin and to the second pipe.

One further aspect of the present invention is to provide the system for collecting material wherein the material collection conduit is configured to carry a flow of the material of from about 20 gpm to about 2000 gpm, and the material collection conduit is configured with a minimum diameter of from about 3 inches to about 12 inches.

Still another aspect of the present invention is to provide the system for collecting material in a basin having a bottom for supporting the material, the basin being configured with equipment that provides the material supported on the bottom. The equipment may be configured in a position relative to the bottom to provide low-clearance height between the bottom and a lower portion of the equipment. The system may include a low-profile apparatus for collecting the material from the bottom of the basin. The low-profile apparatus includes a first rigid pipe. The first rigid pipe defines a first conduit. A second rigid pipe defines a second conduit. The first and second pipes are in telescopic relationship, with the second pipe being received within the first pipe so that the first and second conduits of the pipes cooperate to define a material collection conduit. The material collection conduit extends generally parallel to the bottom of the basin and in the low-clearance height between the equipment and the bottom. One or more headers are secured to the first pipe. The headers have openings through which to collect the material. Each header defines a header conduit extending from the openings to the respective conduits of the rigid pipes to carry the material to the material collection conduit. To facilitate the collection, the low-profile apparatus may further include a low-profile drive connected to the first pipe, the drive being configured to move the first pipe relative to the basin and to the second pipe. The drive of the low-profile apparatus may be configured with a cable secured to the first rigid pipe and extending along the bottom under the equipment to move the first pipe relative to the basin and to the second pipe and under the equipment in the basin. Also, a seal may be positioned between the first pipe and the second pipe to promote flow of the material from the headers to the material collection conduit defined by the pipes. The seal is positioned inside the first pipe and outside the second pipe, the seal also permitting relative movement between the pipes in the telescopic relationship.

A related aspect of the present invention is that the system is configured to be used in a basin having spaced first and second end walls, and the second rigid pipe is configured to extend from the first end wall to the second end wall. In this aspect, the first pipe may be configured to extend in the telescopic relationship with respect to the second pipe along a distance greater than half a length of the basin between the end walls. The second pipe may also be configured with a material collection opening through which to receive the material from the first pipe.

A still other related aspect of the present invention is that the first and second pipes are configured so that in the telescopic relationship the first pipe has opposite ends, and the first pipe is always outside and coaxial with at least a portion of the second pipe. In this aspect, a seal is provided at each of the opposite ends of the first pipe to promote flow of the material from a basin through headers carried by the first pipe. The material flows from the headers into the first pipe for flow through a material collection opening in the portion of the second pipe, so that the second pipe receives the material from the first pipe for discharge from the basin.

A yet other related aspect of the present invention is that the basin is configured with opposed end walls, and the second pipe is configured to be supported adjacent to each of the end walls. The material collection conduit comprises an opening in the second pipe through which to receive the material from the first pipe. In this aspect, the first pipe is configured with a length that exceeds half of the length of the basin between the opposed end walls so that the opening in the second pipe is always covered by the first pipe.

Other aspects and advantages of the present invention will become apparent from the following detailed descriptions, taken in conjunction with the accompanying drawings, illustrating by way of example, the principles of the present invention.

BRIEF DESCRIPTION OF THE DRAWINGS

The present invention will be readily understood by the following detailed description in conjunction with the accompanying drawings, wherein like reference numerals designate like structural elements or operations.

FIG. 4 is a cross sectional view taken along lines 4—4 in FIG. 2B, showing details of a fastener that secures an annular seal to the outer pipe.

DETAILED DESCRIPTION OF THE PREFERRED EMBODIMENTS

An invention is described for significantly increasing the flow rate through header pipes that collect material from the bottom of a basin, without causing the above-described problems in priming a sludge collection system. Telescopic pipe structures provide a way of achieving such sludge collection, while having an easily primed collection system, and providing the entire sludge collecting system in a low-clearance space under the settler and flocculating equipment that extends down near the bottom of the basin.

In the following description, numerous specific details are set forth in order to provide a thorough understanding of the present invention. It will be understood, however, to one skilled in the art, that the present invention may be practiced without some or all of those details. In other instances, well known operations and structure have not been described in detail in order to not obscure the present invention.

Figure 1A:
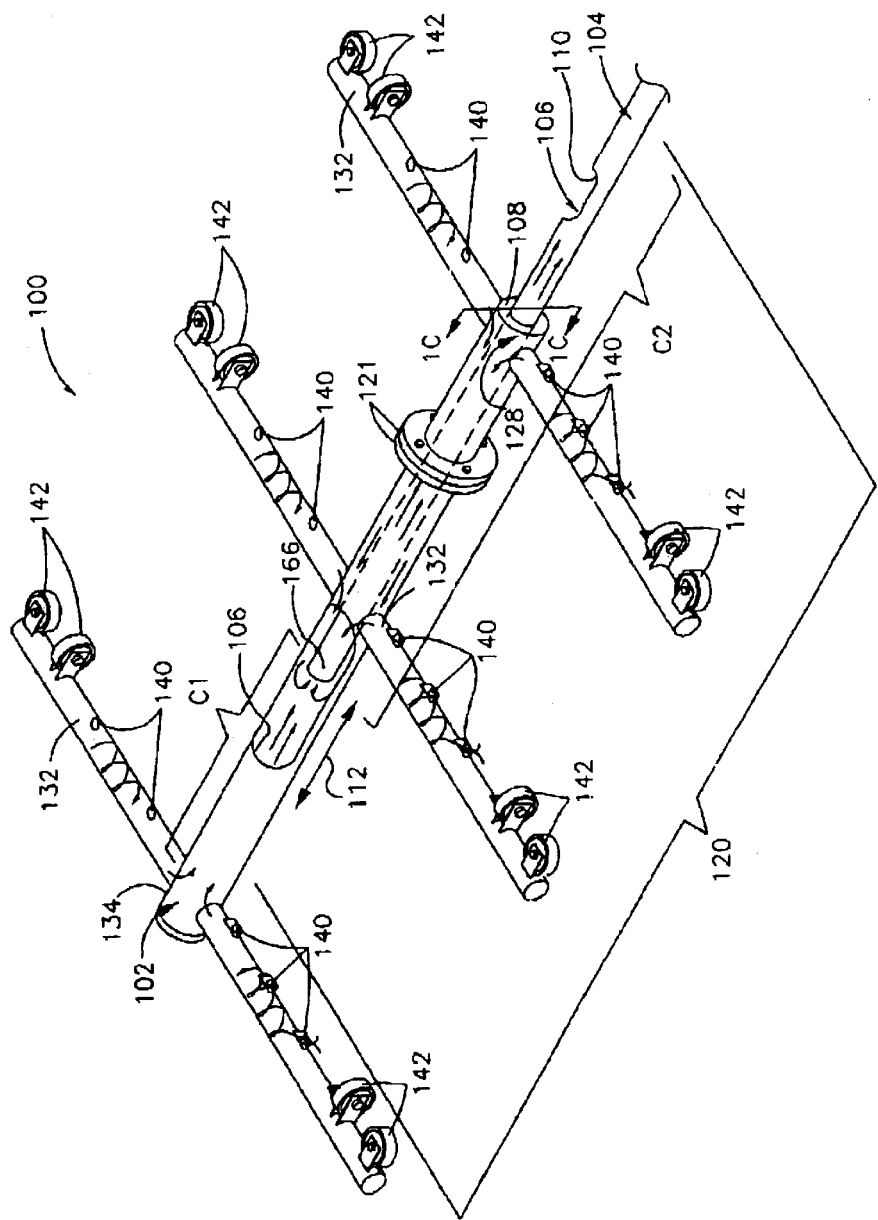
FIG. 1A is a perspective view illustrating a system of the present invention for collecting material.

Referring now to the drawings, FIG. 1A illustrates a system 100 of the present invention for collecting material.

The material may initially be in, or mixed with, a liquid, such as water or water-like fluids typically found in settlers, flocculators or other liquid treatment plants. For example, the material may be the above-referenced material collected from liquids in plate or tube settlers that promote settling of the material to the bottom of the basin. The settlers may be fabricated according to U.S. Pat. No. 5,391,306, issued Jun. 21, 1995, and entitled "Settler With Preset Outlet Area Deck and Variable Angle Removable Lamina and Method of Using Settler", in which setter plates are movable, for example, and the disclosure of such patent is incorporated herein by this reference. Additionally, the material may inadvertently move from the flocculators to the bottom of the basin. Whether the materials are from settlers, or flocculators, or from other sources or equipment, the materials may be referred to as sludge.

In the system, a first rigid pipe 102 and a second rigid pipe 104 each define a conduit 106. The pipes 102 and 104 are configured to be rigid, as compared to the above-described flexible hoses that are light and tend to bend and allow floatation, as described above. Thus, the rigid pipes 102 and 104 do not bend easily, if at all, and are not subject to the above-noted problems of the flexible hoses. For ease of description, the first rigid pipe 102 and the second rigid pipe 104 may be referred to as "pipes", without referencing the rigidity, but in each case the rigid characteristic (or property) is provided. To achieve such rigidity, the pipes 102 and 104 are preferably made from plastic such as polyethylene (PE), polyvinylchloride (PVC), or acrylonitrile butadene styrene (ABS), for example. To provide more weight per unit length, and thus more resistance to floatation, the pipes 102 and 104 may be made from metal. In a most preferred embodiment, the pipes 102 and 104 may be made from stainless steel. The metal pipes 102 and 104 have the most weight per unit length and thus resist floatation more than the plastic pipes which have neutral buoyancy. The rigid pipes also have smooth insides, and without the bends of the flexible hoses are straight and cause less head loss than the flexible hoses.

The second pipe 104 may be referred to as an inner pipe in that it is received partially or entirely inside the first pipe 102 in a telescopic relationship. The first pipe 102 may be referred to as the outer pipe. To provide adequate flow of the collected materials and liquid, the inner pipe 104 may be configured with a nominal (inside) diameter of from 3 inches to 12 inches, for example. The outer pipe 102 may be configured with a nominal diameter that is about 2 inches greater than that of the inner pipe 104 when the inner pipe has the 3 inch nominal diameter, for example. The outer pipe 102 may be configured with a nominal diameter that is about 4 inches greater than that of the inner pipe 104 when the inner pipe has the 12 inch nominal diameter, for example. The larger diameter of the outer pipe 102 provides a radial clearance of about 1 to 2 inches between a wall 108 of the outer pipe 102 and a wall 110 of the inner pipe 104. According to the diameters selected for flow rate purposes, the pipes 102 and 104 may have a respective wall 108 and 110 that is thin, such as a wall thickness of about 0.083 to about 0.125 inches. Such adequate flow may be in a range of from about 20 gpm (corresponding to the 3 inch diameter inner pipe 104 ) to about 2000 gpm (corresponding to the 12 inch nominal diameter inner pipe 104 and 16 inch nominal diameter outer pipe 102). It may thus be understood that the rigid inner pipe 104 may be sized to provide a substantially greater flow rate than the maximum 200 gpm flow rate generally provided by the flexible hose that is subject to the priming problems described above.

FIG. 1A shows that the first and second pipes 102 and 104 are in the telescopic relationship, the inner pipe 104 being received partially or fully within the outer pipe 102, with the pipes 102 and 104 in coaxial relationship. The telescopic relationship is also one in which the pipes 102 and 104 are free to move in an axial direction (see arrow 112) relative to each other so that the longest combined, or extended, length of the pipes (see LE in FIG. 2B) is about the sum of each separate length of each pipe 102 and 104. The length LE also corresponds to an extended position of the pipes 102 and 104. In the extended position, the outer pipe 102 overlaps the inner pipes 104 by about four to six inches, for example. The axial direction 112 of relative movement also allows the pipes 102 and 104 to move so that the inner pipe 104 may be almost fully received within the outer pipe 102, and the combined, or collapsed, length (see LC in FIG. 2A) of the pipes 102 and 104 is the value of the longer of the two pipes. The length LC also corresponds to a collapsed position of the pipes 102 and 104. In this manner, the conduits 106 of the pipes 102 and 104 cooperate to define a material collection conduit 120 that has a variable length.

Figure 1B:
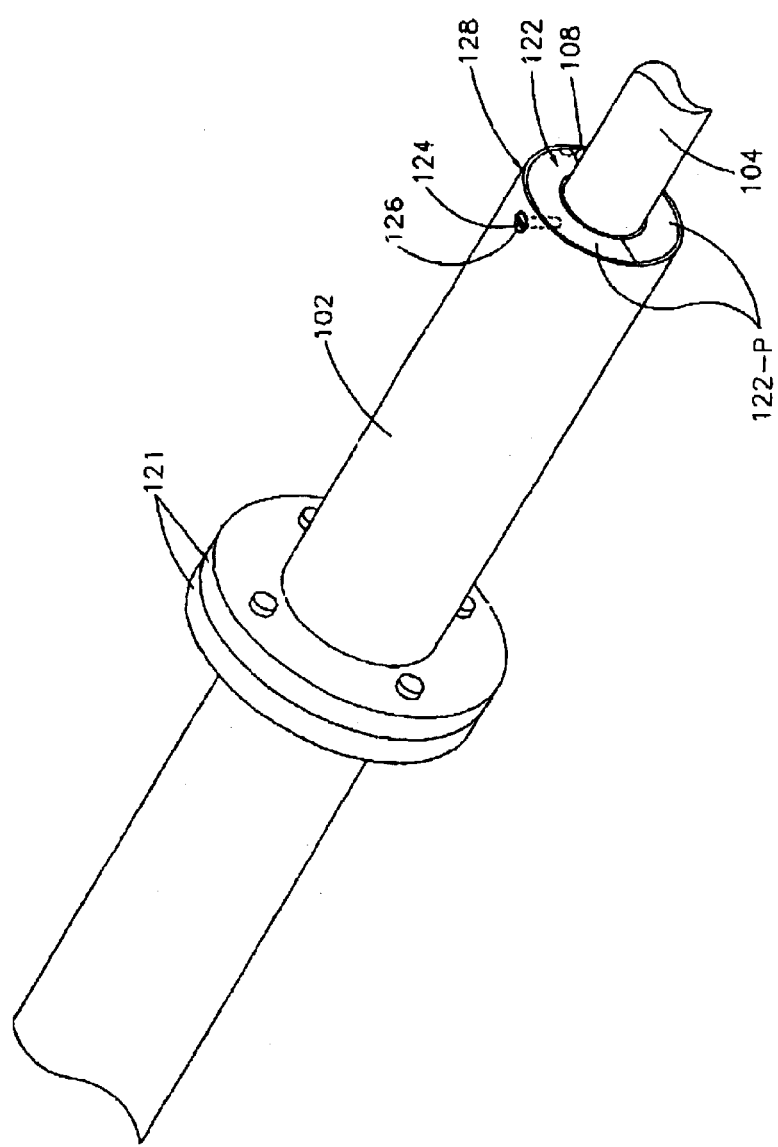
FIG. 1B is a perspective view illustrating a portion of the system shown in FIG. 1A, wherein flanges on an outer pipe are shown.
Figure 1C:
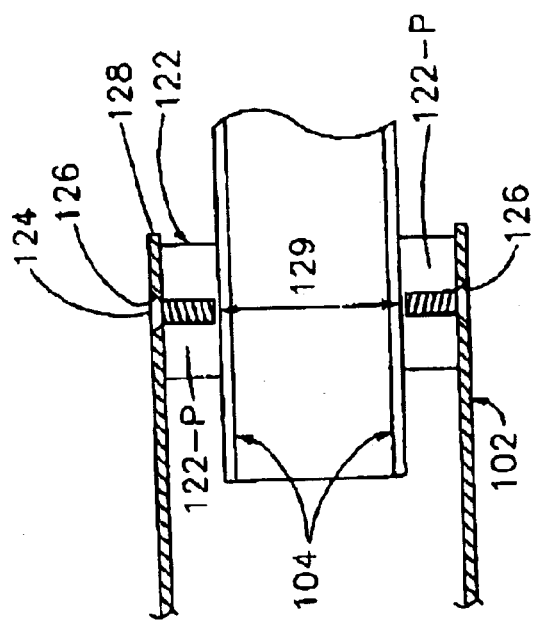
FIG. 1C is a cross sectional view taken along line 1C—1C in FIG. 1A, illustrating the insides of telescopic pipes of the system shown in FIG. 1A.

The length of each separate one of the pipes 102 and 104 is generally the same, and may range from about 20 feet to about 100 feet, which length depends on factors described below. The telescopic relationship between the two pipes 102 and 104 is illustrated in FIG. 1A, which shows one part (see C1) of the material collection conduit 120 configured from the conduit 106 of the outer pipe 102 when the inner pipe 104 is only partially within the outer pipe 102. FIG. 1A shows a second part (see C2) of the material collection conduit 120 configured from the conduit 106 of the inner pipe 104 when the inner pipe 104 is only partially within the outer pipe 102. Part C2 is shown extending partially within and then to the right of the first pipe 102 as shown in FIG. 1A. The conduit 106 of the inner pipe 104 has the lesser diameter of the two pipes 102 and 104, and must be sized to provide the desired flow rate of the material and the liquid that are collected. In a different sense, it may be understood that the approximate maximum 16 inch nominal diameter of the telescoped pipes 102 and 104 and other factors of the present invention may provide a maximum vertical dimension DM (FIG. 3A) of about two feet. This maximum vertical dimension DM is referred to as a low profile, wherein "low" designates a value less than a clearance, or height distance, H (FIG. 3A) described hereinbelow. This low profile also takes into consideration another factor, namely that the outer pipe 102 may be provided and configured as shown in FIG. 1B with an assembly of short pipes that are connected by flanges 121, for example, such that the flanges 121 are within the low profile. FIGS. 1B and 1C show a seal 122 in the outer pipe 102. For clarity of illustration, the seal 122 is not shown in FIG. 1A. The seal 122 has properties of a bearing, and may be configured from polymer. Thus, the seal 122 may also be referred to as a bearing, and is configured to be mounted over the inner pipe 104. In one embodiment of the seal 122, two C-shaped seal pieces 122-P are provided. The C-shaped pieces 122-P are placed together to define a thick circle, or annular-shaped, or donut-shaped, configuration. A fastener 124 such as a screw, extends through each of two holes 126 adjacent to a seal end 128 of the outer pipe 102. The screws 124 extend through the holes 126 and into the respective C-shaped piece 122-P to retain the respective one of the C-shaped seal pieces 122-P adjacent to such seal end 128 and with the annular-shaped seal 122 mounted over the inner pipe 104. The annular, or donut, -shaped configuration of the seal 122 provides an access hole 129 in which to receive the inner pipe 104. The outer diameter of the seal 122 is configured to be about equal to, or somewhat less than, the outer diameter of the outer pipe 102, which as noted above is selected according to the diameter of the inner pipe 104.

Referring to FIGS. 1A–1C, with this configuration, and with the seal 122 fixed to the outer pipe 102, during relative movement between the inner pipe 104 and outer pipe 102 the seal 122 may rub tightly against the outside of the inner pipe 104 to perform a sealing function. With the pipes 102 and 104 operated at low pressure, the seal 122 reduces the flow of the material into the material collection conduit from other than headers 132 provided with header openings 140. Because the header openings 140 are spaced across a width (not shown) of the basin 150 (FIG. 2A), the seals 122 promote sludge collection across the width of the basin 150. While the seal 122 rubs against the inner pipe 104 in this manner, the seal 122 also permits the relative movement between the pipes 102 and 104 in the telescopic relationship. In detail, the seal 122 allows the outer pipe 102 to be moved relative the inner pipe 104 in a movement (see arrow 112, FIG. 1A) referred to as traversing of the outer pipe 102.

The traversing of the outer pipe 102 facilitates similar traversing of one or more of the headers 132 that are secured to the outer rigid pipe 102. FIG. 1A shows three such headers 132, and shows an end 134 of the outer pipe 102 that is closed to facilitate operation of the headers 132. However, more than one header 132 may be provided between one of the headers 132 that is near the left end 134 and another one of headers 132 that is near the seal end 128 of the outer pipe 102, so that the desired flow rate of material and liquid (e.g., sludge) is achieved. Each header 132 is a hollow member such as a pipe or conduit. An exemplary plurality of headers 132 is shown in FIG. 1A, as three headers, each being secured to the outer pipe on opposites sides of the outer pipe 102. Each of the headers 132 may be configured according to U.S. Pat. No. 5,914,049. Such configuration includes material and liquid inlet, or header, openings 140 that facilitate collection of the material and liquid with the material. In terms of these openings 140, the seal 122 shown in FIGS. 1A and 1C need only be effective to limit the leakage of the sludge and liquid into the material collection conduit 120 through the seal 122 (rather than having all the flow be through the openings 140) to a flow about equal to the flow into one or two of these openings 140. Opposite ends of each header 132 are closed, and the end that is secured to the outer pipe 102 is open to permit the material and liquid to enter the outer pipe 102. The headers 132 are also provided with rollers 142 which guide the headers 132 and the pipes 102 and 104 as described below.

To provide adequate flow of the collected materials and liquid, the headers 132 may be configured with various nominal (inside) diameters, which are selected according to the desired flow rate through the material collection conduit 120, and in particular through the part C2 of the inner pipe 104. For example, the inner pipe 104 may have a nominal diameter of about four inches and the outer pipe 102 a nominal diameter of about six inches, for example, and two headers 132 may be provided. Each header 132 may have a three inch nominal diameter. With suitably sized material and liquid collection openings 140 in the two headers 132, this configuration will provide a flow rate of about 250 gpm through the inner conduit 104. This example shows that the present invention may provide substantially more flow rate (i.e., 250 gpm) using the same nominal (four inch) diameter of the inner pipe 102 as the maximum diameter four inch nominal diameter flexible prior art hose that has the maximum 200 gpm flow rate and more head loss.

Figure 2A:
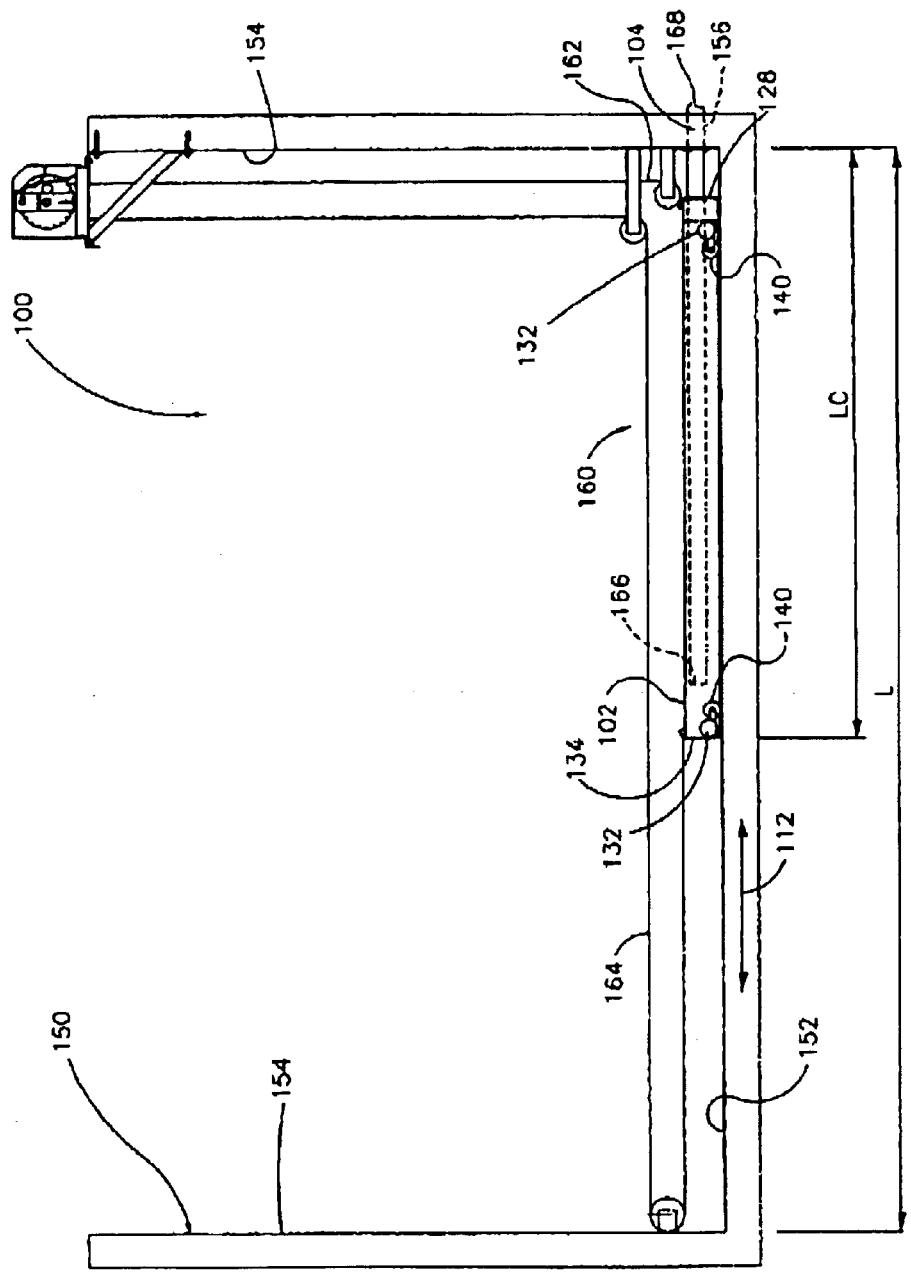
FIG. 2A is an elevational view showing the system installed in a container, which is typically referred to as a basin.

FIG. 2A shows one of the systems 100 installed in a container, which is typically referred to as a basin 150.

Details not essential to the system 100 are not shown, but it may be understood that the liquid and materials enter the basin 150, and depending on the type of basin 150, the materials in some manner make their way to a floor, or bottom 152 of the basin 150. For clarity of description, the materials and liquid are not shown. When the materials accumulate on the bottom 152, the system 100 serves to collect them and guide them from the basin 150. The basin 150 is provided with opposite end walls 154. An end wall 154 on the exemplary right of the basin 150 is provided with an outlet hole 156 that receives the inner pipe 104 of the system 100. The inner pipe 104 is secured to the right wall 154, as by a coupler or fitting, such that the inner pipe 104 is fixed to the end wall 154. The hole 156 is adjacent to the bottom 152 so that the axial direction (arrow 112) extends close to, and parallel to, the bottom 152. The basin 150 is shown with a length L between the end walls 154. The length of the inner pipe 104 in the basin 150 has a value of about ½ L as shown in FIG. 2A. The system 100 is also shown with the outer pipe 102 in the above-described telescopic relationship with the inner pipe 104. Thus, the outer pipe 102 extends over the inner pipe 104. The rollers 142 shown in FIG. 1A engage the side walls (not shown) and bottom 152 of the basin, roll through the sludge, and keep the bottom of the outer pipe 102 an exemplary few inches above the bottom 152. The outer pipe 102 is shown with an exemplary two headers 132, and the headers 132 collectively extend across a width (not shown) between the side walls of the basin 150.

In FIG. 2A the outer header 102 is shown in the collapsed position, fully on (or covering) the inner pipe 104, in contrast to the position shown in FIG. 1A. In this collapsed position, the rightward header 132 is adjacent to the right end wall 154 and the leftward header 132 is in the middle of the basin (between the end walls 154). A cable drive 160 is provided to move the outer pipe 102 in the above-described traversing movement relative to the inner pipe 104. The cable drive 160 may include a first cable 162 connected to the right (outlet) end 128 of the outer pipe 102, and a second cable 164 connected to the left end 134 of the outer pipe 102. The cables 162 and 164 are alternately moved left and right by a shared-reel drive described in U.S. Pat. No. 5,655,727, issued on Aug. 12, 1997, and entitled "Sludge Collector Method and Drive With Shared Reel For Taking Up and Paying Out Cables", the disclosure of which is incorporated by reference. The cable drive 160 moves the outer pipe 102 to the left from the collapsed position shown in FIG. 2A to the extended position shown in FIG. 2B. The rollers 142 again roll over the floor 152 and against the side walls, and the headers 132 move through and into the sludge that is on the floor 152.

Installation of the system 100 may be understood from FIG. 2A. With the length of each separate one of the pipes 102 and 104 generally the same, and ranging from about 20 to about 100 feet, the length of each pipe 102 and 104 depends on such factors as the length of the basin 150, which may range from about 40 to about 200 feet between the end walls 154. To install the system 100 in an existing basin 150 in which the equipment has been previously installed, shorter length outer and inner pipes 102 and 104, respectively, are used. Thus, for a 100 foot long basin 150 in the configuration shown in FIG. 2A, the outer pipe 102 may be in 20 foot lengths and the inner pipe 104 may be in 20 foot lengths. The headers 132 will have been secured to the appropriate lengths of the outer pipe 102, such as at a factory. The lengths of the outer pipe 102 are placed in the basin 150 under the equipment, or near the bottom 152, and the flanges 121 are secured together. The lengths of the inner pipe 104 are placed in the basin 150 under the equipment, or near the bottom 152, and are secured together, as by welding or gluing described below. The outer pipe 102 and the inner pipe 104 may be oriented at a diagonal relative to the end walls 154 of the basin 150 and the outlet end 128 of the outer pipe 102 is placed over an inlet end 166 of the inner pipe 104 to achieve the telescopic relationship. The two pipes 102 and 104 are then moved into position about centrally between the side walls (not shown) of the basin 150 and an outlet end 168 of the inner pipe 104 is inserted through the end wall 154 (e.g., the rightward end wall 154 in FIG. 2A).

Figure 2B:
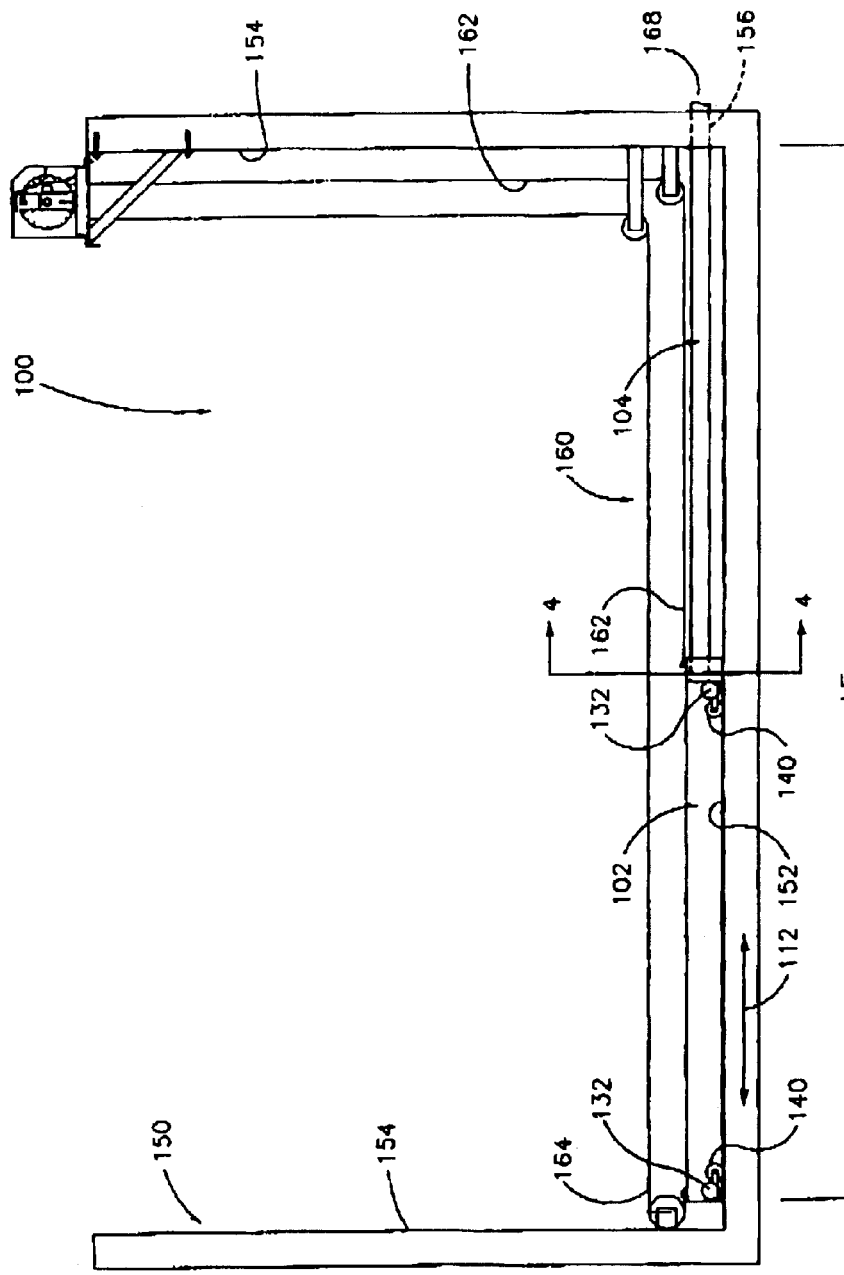
FIG. 2B is an elevational view showing an outlet end of an inner pipe.

FIG. 2B shows the outlet end 168 of the inner pipe 104 extending outside the basin 150. The outlet end 168 is connected to a valve and vacuum pump (not shown). The pump causes a low pressure to be applied to the outlet end 168 of the inner pipe 104. That low pressure causes a low pressure in the material collection conduit 120 defined by the pipes 102 and 104, so that the sludge is caused to flow into the openings 140 in the headers 132 as the outer pipe 102 is traversed. According to the U.S. Pat. No. 5,914,049 identified above, the sludge enters the headers 132 at a tangent and assumes a helical flow path toward the outer pipe 102. The sludge enters and flows through the outer pipe 102, and then enters and flows through the inner pipe 104 to the outlet end 168 of the inner pipe 104. The sludge flows past the control valve (not shown) and to other conduits outside the basin 150 for collection and draining of the liquid to form dry sludge. When the outer pipe 102 reaches the left end wall 154 of the basin 150, the cable drive 160 reverses and the outer pipe 102 is traversed to the right and to the fully collapsed position shown in FIG. 2A. The reversing and opposite traversal alternate through many cycles of collecting the material and the liquid.

Figure 3A:
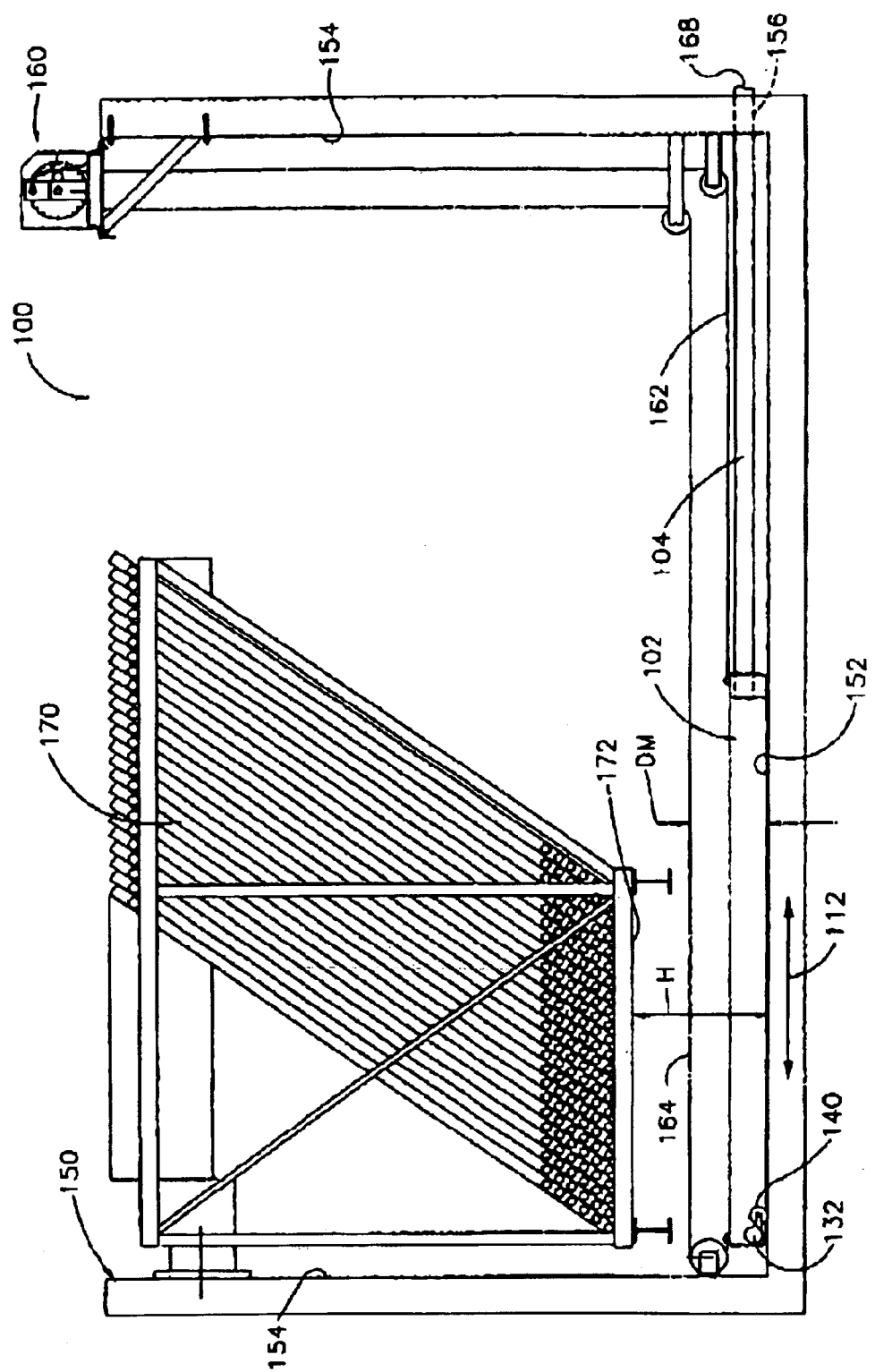
FIG. 3A is an elevational view showing an extended position of the inner and outer pipes in a telescopic relationship.

FIG. 3A shows another embodiment of the system 100 in which one header 132 is provided on the outer pipe 102. Also, an exemplary item of equipment 170 is shown in a leftward section of the basin 150. The equipment 170 is configured in the above-described position relative to the bottom 152 of the basin 150 to provide a low-clearance height H between the bottom 152 and a lower portion or bottom 172 of the equipment 170. For example, the low-clearance height H may be between the floor 152 of the basin 150 and a bottom (not shown) of a stirring facility of a flocculator, or between the floor 152 of the basin 150 and the bottom of the plates of a plate settler. This clearance H may be about two feet and is a source of the above-described problems with the prior flexible hoses, which problem is solved by the system 100. The low profile of the maximum vertical dimension DM of the system 100 easily fits within the low-clearance height H, because the height of the low-profile dimension DM designates the value less than the low-clearance height H described above. In more detail, because the two pipes 102 and 104 are in the telescopic relationship, the two pipes 102 and 104 and the cable drive 160 occupy less height than two separate (non-coaxial) pipes would occupy, and the telescopic pipes 102 and 104 do not float above the bottom 152 of the basin 150. Moreover, the positions of the cables 162 and 164 in FIGS. 2A, 2B, 3A and 3B are exemplary for clarity of illustration, whereas in practice the cable 162 and 164 may actually run in the sludge at the bottom 152 of the basin 150 (and thus take up less vertical dimension DM).

In FIG. 3A the outer pipe 102 is shown in the extended position, opposite to the collapsed position shown in FIG. 2A. The inner pipe 104 is shown extending through and fixed to the right end wall 154 of the basin 150. Thus, the outer pipe 102 is in the fully extended position to show another configuration of the pipes 102 and 104 in the basin 150. In this extended position, the one exemplary header 132 is adjacent to the left end wall 154 and the outer pipe 102 is under the bottom 172 of the equipment 170 within the space provided by the low-clearance height H. The cable drive 160 is shown with the first cable 162 connected to the right end of the outer pipe 102, and the second cable 164 connected to the left end of the outer pipe 102. The cables 162 and 164 are operated in the same manner as described above to traverse the outer pipe 102.

Figure 3B:
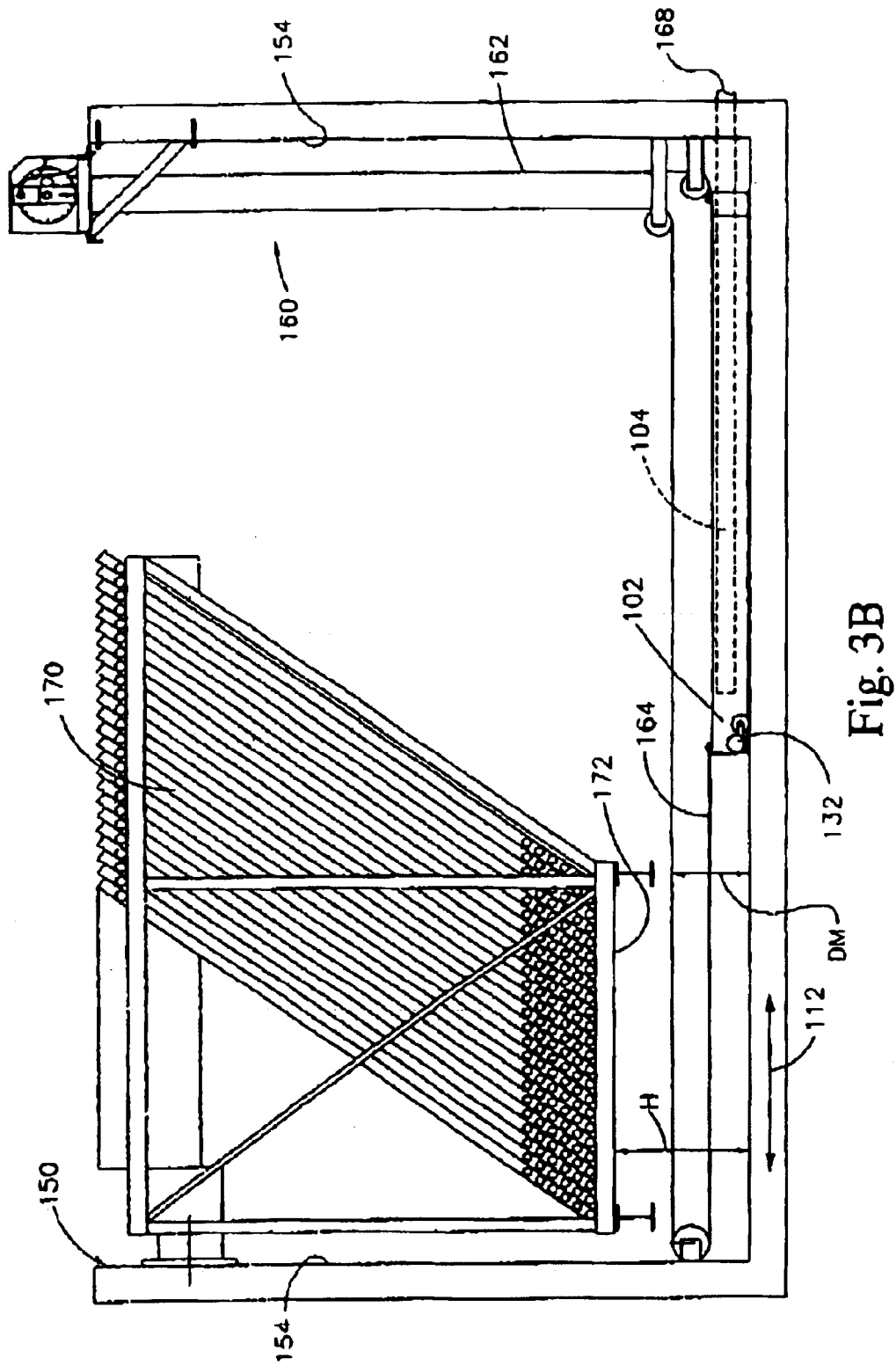
FIG. 3B is an elevational view showing a cable drive for moving the outer pipe to the right from the extended position shown in FIG. 3A to a collapsed position shown in FIG. 3B.

FIG. 3B shows that the cable drive 160 moves the outer pipe 102 to the right from the extended position shown in FIG. 3A to the collapsed position shown in FIG. 3B. Again, the rollers 142 roll over the floor 152 and side walls (not shown) and the header 132 moves through and into the sludge that is on the floor 152. The header 132 collects the sludge. FIG. 3B shows the outlet end 168 of the inner pipe 104 extending outside of the basin 150 (past the right end wall 154), and the connections to the pump are the same as described above. As the header 132 moves through the sludge, the sludge and liquid enter and flow through the outer pipe 102, and then enter and flow through the inner pipe 104 to the outlet end 168 of the inner pipe 104. When the outer pipe 102 reaches the right end 154 of the basin 150, the cable drive 160 reverses and the outer pipe 102 then traverses to the left and back to the fully extended position shown in FIG. 3A. The reversing and opposite traversal alternate through many cycles of collecting the material. It may be appreciated that with only the one exemplary header 132 as shown in FIGS. 3A and 3B, the header 132 of the system 100 only collects (or removes) the sludge from the portion of the basin 150 under the equipment 170.

FIG. 4 shows details of the fastener 124 that secures the annular seal 122 to the outer pipe 102. Also shown is the inner pipe 104 supported on the seal 122, which in turn is supported and carried by the outer pipe 102. It may be understood that with only one seal 122 provided between the two pipes 102 and 104, the outer pipe 102 is free to move between the fully extended position and the collapsed position. Also, to provide the outer surface of the inner pipe 104 with a smooth configuration against which the seal 122 rubs and slides, the inner pipe 104 may be provided and configured as an assembly of short pipes that are connected by an inner sleeve 180, for example, show generally in FIG. 4. For clarity of illustration, the inner sleeve 180 is shown as one circular line, whereas the inner sleeve 180 would be about 0.083 inches in wall thickness. Also, the inner surface of the inner pipe 104 may be slightly recessed to provide a thin slot in which the inner sleeve 180 may be received. The inner sleeve 180 may be secured to the inner pipe 104 as by adhesive or welding, for example.

Figure 5:
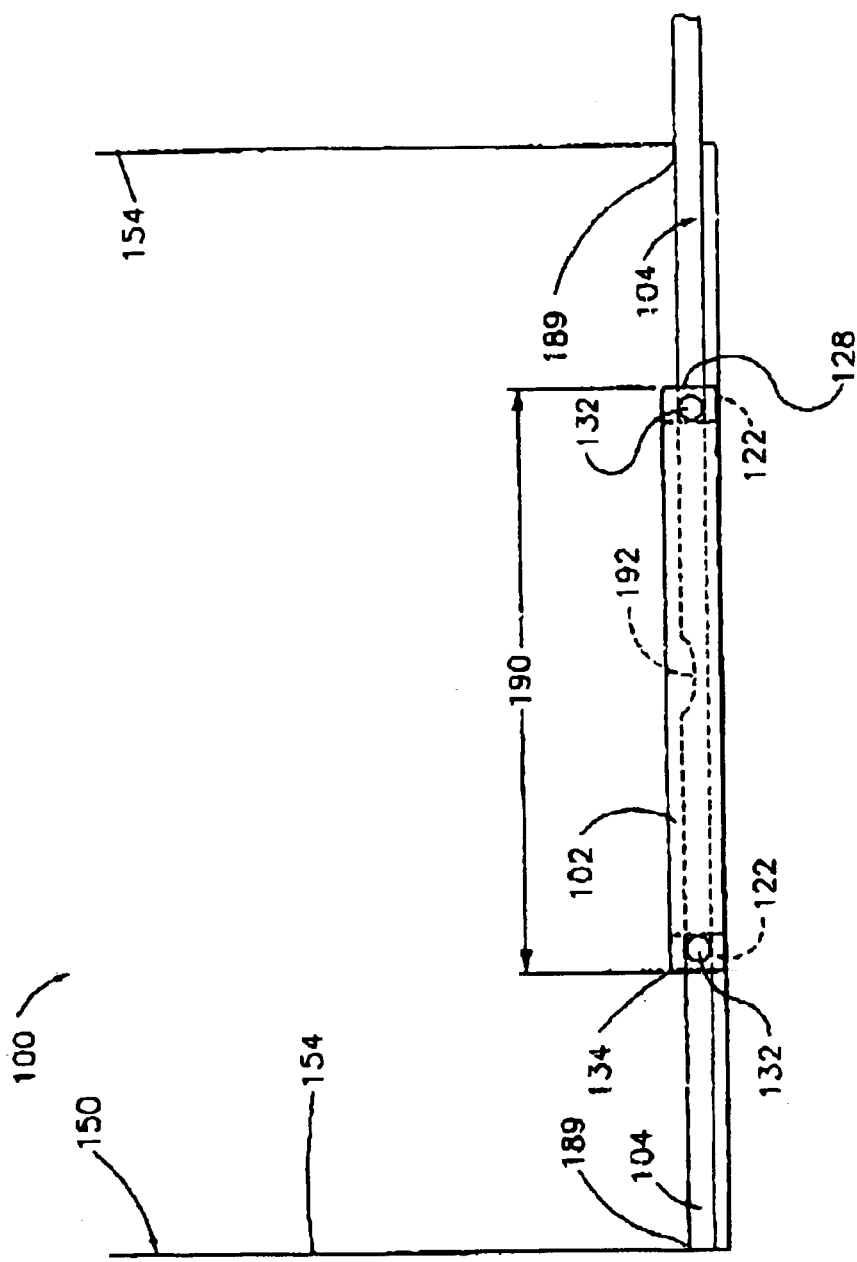
FIG. 5 is a view similar to FIG. 2A in which the basin is configured with opposed end walls, and the second pipe is configured to be supported adjacent to each of the end walls and is provided with an opening through which to receive the material from the first pipe.

FIG. 5 shows another embodiment of the system 100 also configured to be used in the basin 150 having the spaced opposite end walls 154. The walls 154 may be referred to as first and second end walls 154. The first end wall 154 is shown on the left of FIG. 5 and the second end wall 154 is shown on the right. The second rigid pipe 104 is configured to extend from the first (left) end wall 154 to the second (right) end wall 154. The second pipe 104 is configured with opposite ends 189 that are supported adjacent to each of the end walls 154, as by being secured to each wall 154, as shown in FIG. 5, or being supported by a mount (not shown) that is on the bottom 152 adjacent to each of the end walls 154. The first pipe 102 may be configured to extend in the telescopic relationship with respect to the second pipe 102 along a distance 190 that is greater than half of the length L of the basin 150 between the end walls 154. The second pipe 104 may also be configured with a material collection opening 192 located between the ends 189. The material collection opening 192 is provided through which to receive the material from the first pipe 102 under the action of the low pressure applied to the second pipe 104. The respective first and second pipes 102 and 104 are configured so that in the telescopic relationship the first pipe 102 has the opposite ends 128 and 134. Also, the first pipe 102 is always outside and coaxial with at least a portion of the second pipe 104, wherein the portion is about equal to the distance 190. The seal 122 is provided at each of the opposite ends 128 and 134 of the first pipe 102. The seals 122 provide the above-described functions The material is received by the first pipe 102 from the headers 132. The material then flows through the second pipe 104 out of the basin 150 as described above. Thus, in this embodiment, the material collection conduit 120 also includes the material collection opening 192 through which the material is received from the first pipe 102. In this embodiment, the first pipe 102 is configured with the length 190 that exceeds half of a length L of the basin 150 between the opposed end walls 154. This length 190 assures that the opening 190 in the second pipe 104 is always covered by the first pipe 102. Also, the header 132 located adjacent to the end 134 of the first pipe 102 need only traverse substantially less that the length L of the basin 150 because the second header 132 at the end 128 of the first pipe 102 will collect material from the bottom 152 as the other header 132 collects the material.

It may be understood that this embodiment of the system 100 is especially suited to basins 150 having a very long length L, which may be up to about 200 or more feet. With the opposite ends 189 of the second pipe 104 secured in a fixed manner adjacent to the end walls 154 of the basin 150, and with closure of the end 189 that does not extend through the right end wall 154, the first pipe 102 in effect rides along and is guided by the second pipe in the axial direction 112 (FIG. 1A) and throughout the distance of the traverse of the first pipe 102. In such traverse, at least one header 132 passes over each location of the bottom 152 of the basin 150 and collects the material with liquid as described above. The material and liquid flow through the headers 132 and into the material collection conduit 120. In detail, from the headers 132 the material and liquid flow into the first pipe 102, through the material collection opening 192 and into the second pipe 104 to be guided out of the basin 150.

It may be understood, then that the system 100 of the present invention meets all of the above-described needs by providing a way of significantly increasing the flow rate through the headers 132 that collect the material and liquid without causing the above-described problems in priming the sludge collection system 100. This results from the telescopic pipes 102 and 104 staying in a line of the axial direction 112 adjacent to the bottom 152, and thus not floating upwardly into or against the bottom 172 of the equipment 170 (FIG. 3A), for example. The system 100 of the present invention also provides the described way of achieving such sludge collection, while having an easily primed collection system, and providing the entire sludge collecting system in the space of the low-clearance height H under the bottom 172 of the settler and flocculating equipment 170 that extends downwardly near the bottom 152 of the basin 150. The way of significantly increasing the flow rate through the header 132 that collects the material and the liquid from the bottom 152 is by using the telescopic pipes 102 and 104, which define a larger-diameter pipe assembly connected to the headers 132 than the prior flexible hoses.

The way of avoiding the problems in priming the sludge collection system 100 is by making this telescopic pipe system 100 (that forms the larger-diameter pipe assembly) rigid so that it is not free to rise (float) above the level of the headers 132 or the outlet end 168 of the inner pipe 104 in the basin 150. The way of achieving such sludge collection, while having the easily primed collection system, and providing the entire sludge collecting system 100 in the space of the low-clearance height H under the bottom 172 of the settler and flocculating equipment 170 that extends down near the bottom 152 of the basin 150, is by mounting the telescopic pipes 102 and 104 (that define the larger-diameter, rigid pipe assembly) directly adjacent to the bottom 152 of the basin 150, e.g., along the traverse path 130 taken by the headers 132 as they traverse the bottom 152 of the basin 150. The way of achieving these features, while still allowing the sludge collecting system 100 to traverse the headers 132 from one end wall 154 of the basin 150 to the opposite end wall 154 of the basin 150, is by making this larger-diameter rigid pipe assembly telescopic, that is, by providing the telescopic relationship between the two pipes 102 and 104. In this manner, one telescoping pipe 104 is secured or fixed to the basin 150, as by being held in place as it extends through the end wall 154 of the basin 150 to the outside of the basin 150. Such fixed pipe 104 is the inner, larger-diameter pipe (measured relative to the small, e.g., maximum of four inches of the prior flexible pipes described above. The other telescoping pipe is the outer pipe 102, somewhat larger than the inner fixed pipe 104 so as to receive the inner pipe 104 and permit the relative movement between the two telescoping pipes 102 and 104. The outer, movable, telescopic pipe 102 carries the headers 132 and is moved by the low-profile cable drive 160 relative to the bottom 152 of the basin 150 and between the end walls 154 of the basin 150 to present the headers 132 to the sludge that accumulates on the bottom 152 of the basin 150 awaiting collection.

Although the foregoing has been described in some detail for purposes of clarity or understanding, it will be appreciated that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for collecting material, the system being configured to be used in a basin having spaced first and second end walls, the system comprising:

a first rigid pipe, the first rigid pipe defining a first conduit;

a second rigid pipe, the second rigid pipe defining a second conduit;

the first and second pipes being in telescopic relationship one received within the other so that the first and second conduits of the pipes cooperate to define a material collection conduit; and at least one header pipe secured to one of the rigid pipes, the at least one header pipe having at least one opening through which to collect the material, the header pipe defining a header conduit extending from the at least one opening to the respective first or second conduit of the one of the rigid pipes to carry the material to the material collection conduit;

wherein the second rigid pipe is configured to extend from the first end wall to the second end wall.

2. A system for collecting material as recited in claim 1, wherein:

the rigid first pipe is configured to extend in the telescopic relationship with respect to the second rigid pipe along a distance greater than half a length of the basin between the end walls; and the secopd rigid pipe is configured with a material collection opening through which to receive the material from the first rigid pipe.

3. A system for collecting material, comprising:

a first rigid pine, the first rigid pipe defining a first conduit;

a second rigid pipe, the second rigid pipe defining a second conduit;

the first and second pipes being in telescopic relationship one received within the other so that the first and second conduits of the pipes cooperate to define a material collection conduit;

at least one header pipe secured to one of the rigid pipes, the at least one header pipe having at least one opening through which to collect the material, the header pipe defining a header conduit extending from the at least one opening to the respective first or second conduit of the one of the rigid pipes to carry the material to the material collection conduit; and a seal positioned between the first pipe and the second pipe, the seal being positioned inside the first pipe and outside the second pipe, the seal permitting relative movement between the pipes in the telescopic relationship wherein the first and second rigid pipes are configured so that in the telescopic relationship the first rigid pipe has opposite ends, and the first rigid pipe is always outside and coaxial with at least a portion of the second rigid pipe, and the seal is provided at each of the opposite ends of the first rigid pipe; and wherein the portion of the second rigid pipe is configured with a material collection opening through which to receive the material from the first rigid pipe.

4. A system for collecting material, comprising:

a first rigid pipe, the first rigid pipe defining a first conduit;

a second rigid pipe, the second rigid pipe defining a second conduit;

the first and second rigid pipes being in telescopic relationship with the second rigid pipe received within the first rigid pipe so that the first and second conduits of the first and second rigid pipes cooperate to define a material collection conduit;

at least one header pipe secured to the first rigid pipe, the at least one header pipe having at least one opening to through which to collect the material, the header pipe defining a header conduit extending from the at least one opening to the respective first or second conduit of the one of the rigid pipes to carry the material to the material collection conduit; and a basin having a bottom for receiving the material, the basin supporting the first and second pipes in the telescoped relationship, the basin being configured with opposed end walls;

wherein the second pipe is in a fixed position relative to the basin and the first pipe is free to move relative to the basin and the second pipe;

wherein the second rigid pipe is configured to be supported adjacent to each of the end walls; and the material collection conduit comprises an opening in the second rigid pipe through which to receive the material from the first rigid pipe.

5. A system as recited in claim 4, wherein:
the first rigid pipe is configured with a length that exceeds half of a length of the basin between the opposed end walls so that the opening in the second rigid pipe is always covered by the first rigid pipe.

6. A method for collecting materials from a bottom of a basin, comprising the operations of:
providing a rigid hollow guide at a fixed location adjacent to the bottom of the basin, the rigid hollow guide being configured with a material inlet; and
mounting a rigid hollow header support surrounding and movable relative to the rigid hollow guide with the material inlet covered by the rigid hollow header support, the rigid hollow header support being configured with at least one material collector opening configured to receive the material from the basin for discharge into the rigid hollow guide through the material inlet;
wherein the mounting operation mounts the rigid hollow guide to extend adjacent to and between each of opposite walls of the basin to facilitate movement of the rigid hollow header relative to the rigid hollow guide and between the walls.

7. A method for collecting materials from a bottom of a basin having spaced opposite first and second end walls, comprising the operations of:
providing hollow guide in the basin at a fixed location adjacent to the bottom the rigid hollow guide being configured with a material inlet and a material outlet;
mounting a rigid hollow header support surrounding the rigid hollow guide so that the material inlet is covered by the rigid hollow header support, the rigid hollow header support being configured with at least one material collector opening;
guiding the rigid hollow header support along the rigid hollow guide; and
sealing the rigid hollow header support to the rigid hollow guide to define a material collection conduit from the at least one material collector opening through at least a portion of the rigid hollow header support through the material inlet and through the rigid hollow guide to the material outlet;
wherein:
the operation of providing the rigid hollow guide in the basin at a fixed location adjacent to the bottom mounts the rigid hollow guide to extend between the spaced opposite walls of the basin from the first end wall to the second end wall so that the material inlet is in the basin and the material outlet is outside the basin.

8. A method as recited in claim 7, wherein:
the operation of mounting the rigid hollow header support surrounding the rigid hollow guide comprises establishing a telescopic relationship between the rigid hollow guide and the rigid hollow header support.

9. A method as recited in claim 7, wherein:
the operation of guiding the rigid holow header support along the rigid hollow guide moves the rigid hollow header support in the basin with the material inlet remaining covered by the rigid hollow header support, during the moving the rigid hollow header support collecting the material from the basin through the at least one material collector opening and discharging the material into the rigid hollow guide through the material inlet.

10. A method as recited in claim 7, further comprising:
urging the material out of the material outlet so that the material flows through the material collection conduit from the basin through the at least one material collector opening through at least a portion of the rigid hollow header support through the material inlet and through the rigid hollow guide to the material outlet and out of the basin.

* * * * *